(12) United States Patent
Kremin et al.

(10) Patent No.: US 8,217,609 B1
(45) Date of Patent: Jul. 10, 2012

(54) CIRCUIT FOR FORMING PHASE SHIFTED SIGNALS FOR THREE PHASE BLDC MOTORS

(75) Inventors: Viktor Kremin, Lviv (UA); Andrey Magarita, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 223 days.

(21) Appl. No.: 12/723,070

(22) Filed: Mar. 12, 2010

Related U.S. Application Data

(63) Continuation of application No. 11/480,036, filed on Jun. 29, 2006, now Pat. No. 7,679,302.

(51) Int. Cl.
*H02K 23/00* (2006.01)

(52) U.S. Cl. .............. 318/437; 318/400.05; 318/400.35

(58) Field of Classification Search .................. 318/437, 318/400.05, 400.35, 400.01, 400.04, 400.34, 318/720, 721, 724
See application file for complete search history.

(56) References Cited

U.S. PATENT DOCUMENTS

| | | | |
|---|---|---|---|
| 4,255,693 A | 3/1981 | Keidl | |
| 4,888,533 A | 12/1989 | Gotoh et al. | |
| 5,640,073 A | 6/1997 | Ikeda et al. | |
| 5,739,651 A | 4/1998 | Miyazawa et al. | |
| 5,818,179 A | 10/1998 | Kokami et al. | |
| 5,857,349 A | 1/1999 | Hamaoka et al. | |
| 5,969,491 A | 10/1999 | Viti et al. | |
| 5,990,642 A | 11/1999 | Park | |
| 6,759,827 B2 | 7/2004 | Kawashima | |
| 7,075,267 B1 | 7/2006 | Cheng | |
| 7,342,367 B2 | 3/2008 | Suzuki | |
| 7,492,113 B2 | 2/2009 | Maeda | |
| 7,679,302 B1 | 3/2010 | Kremin et al. | |
| 2011/0254480 A1* | 10/2011 | Chen et al. | 318/400.13 |

OTHER PUBLICATIONS

USPTO Notice of Allowance for U.S. Appl. No. 11/480,036 dated Oct. 30, 2009; 6 pages.
USPTO Non-Final Rejection for U.S. Appl. No. 11/480,036 dated Apr. 29, 2009; 9 pages.

* cited by examiner

*Primary Examiner* — Karen Masih

(57) ABSTRACT

Disclosed is a controller circuit, comprising a plurality of sense inputs, an instrumentation amplifier block having inputs coupled to the plurality of sense inputs, a filter block coupled to the instrumentation amplifier block, a sum function coupled to the filter block, and a crossing detector block coupled to the filter block and the sum function. A method of controlling motor signals is further described.

20 Claims, 6 Drawing Sheets

600

| 610 | 620 | 630 | 640 | 650 | 660 | 670 | 680 | 690 | 695 |
|---|---|---|---|---|---|---|---|---|---|
| #Phase | $ZC_1$ | $ZC_2$ | $ZC_3$ | Up A | Up B | Up C | Down A | Down B | Down C |
| 0. | 1 | 0 | 1 | 0 | 1 | 0 | 1 | 0 | 0 |
| 1. | 0 | 0 | 1 | 0 | 0 | 1 | 1 | 0 | 0 |
| 2. | 0 | 1 | 1 | 0 | 0 | 1 | 0 | 1 | 0 |
| 3. | 0 | 1 | 0 | 1 | 0 | 0 | 0 | 1 | 0 |
| 4. | 1 | 1 | 0 | 1 | 0 | 0 | 0 | 0 | 1 |
| 5. | 1 | 0 | 0 | 0 | 1 | 0 | 0 | 0 | 1 |

Figure 6.

CIRCUIT FOR FORMING PHASE SHIFTED SIGNALS FOR THREE PHASE BLDC MOTORS

RELATED APPLICATIONS

This application is a continuation of U.S. Ser. No. 11/480,036, entitled "CIRCUIT FOR FORMING PHASE SHIFTED SIGNALS FOR THREE PHASE BLDC MOTORS," filed Jun. 29, 2006.

TECHNICAL FIELD

The present invention relates generally to electronic circuits, and in particular to circuits for brush-less direct current (BLDC) motor control.

BACKGROUND

There exist a number of conventional solutions for BLDC motor control and processing of back electromagnetic field (EMF) signals generated by the motor. The back-EMF signals are signals generated by the rotor permanent magnet while it is spinning which have a force in the opposite direction of that in which the rotor is spinning. The back-EMF signal amplitude is proportional to the rotor rotation speed.

Regardless the control method, the conventional controller should provide a phase switching signal with some phase shift relative to the back-EMF signal. The purpose of the phase switch signal is to spin or drive the motor in the 'forward' direction. The phase shift between the phase switching signal and the back-EMF signal should be maintained at a constant value, regardless of the speed of operation of the motor. This phase shift can be formed by using the analog low-pass filters or using the digital signal processing methods. This invention is related to the use of analog processing techniques for forming the phase shifted control signals.

FIG. 1 shows a conventional motor system 100 having a rotor indicated by a rotating permanent magnet 110, and a first connections A 120, a second connection B 130, and a third connection C 140 providing 3-phase motor drive signals to the rotor. The A 120, B 130 and C 140 signals are motor winding connectors which are coupled to the phase voltage switch (not shown). The rotor is marked schematically as a two pole permanent magnet. The left column marks the rotor position at the start of a commutation and the right column indicates the rotor position at beginning of the next commutation. The coil drive voltage polarity is marked by a positive sign "+" and a negative sign "−", and no-sign means that no drive voltage is applied to the coil at this phase.

For determining the rotor 110 position the non-powered coil is used and the inducted voltage from this coil is sensed. During motor operation sequence the drive signals is applied to the two motor terminals at the same time. The rotation of magnetic rotor 110 generates a back-EMF (electro-magnetic force) signal in the motor coils, the signal from the non-powered coil can be easily detected and processed because there is no power (drive) voltage applied to the coil at this time. This back-EMF signal can be used to determine when to switch the next phase by feeding it to a threshold comparator. The threshold comparator reference voltage is set to a value proportional to half of the supply voltage. During motor operation the phase commutation event is approximately 30 degrees delayed from the back-EMF voltage. This approximately 30 degree delay provides optimum rotor position when at new phase drive voltage applying momentum. This delay can be implemented using a tunable low-pass filter (LPF). This method can be called "classic" or conventional BLDC control method.

The rotation speed of rotor 110 can be adjusted by tuning the coil drive voltage. This can be accomplished by using a pulse width modulated (PWM) source for supply voltage modulation. Steps 150, 155, 160, 165, 170, 175 on FIG. 1 shows the rotation of rotor 100 and the signals on the three phases signals A 110, B 120, and C 130.

FIG. 2 shows a waveform plot 200 of phase angle 210 of the signals versus the table state of the output 220. A plurality of low pass filters (LPF) are used to generate the signals A 120, B 130 and C 140 for 30 degree phase shifting. The signals 'A30' 230, 'B30' 235 and 'C30' 240 are generated by passing the drive signals A, B, C through a low pass filters. These filters are used for forming the drive signals phase delay relative to the back-EMF signals. The symmetry of signals 'A30' 230, 'B30' 235 and 'C30' 240 depends on the pulse width modulation duty cycle because the comparators threshold value should be proportional to the half of the coil's effective (filtered PWM) power supply voltage. In the conventional solution the filtered back-EMF signal is compared with the fixed motor driver power supply voltage (not coils drive voltage). As a result, the filter output signals symmetry depends on coils drive signal duty cycle. For the optimal motor control the phase delay should depending on the of rotation speed only. In the conventional solution the phase delay depends on the pulse width modulation duty cycle that is undesirable for motor control.

A conventional phase switching signal generator circuit 300 is shown in FIG. 3. The conventional phase switching circuit 300 comprises a first sense input (Sense A) 310, a second sense input (Sense B) 312, and a third sense input (Sense C) 314. The sense inputs are coupled respectively to a first low pass filter 320, a second low pass filter 322, and a third low pass filter 324. A roll-off frequency 380 is coupled to each of the low-pass filters 320, 322, and 324. The roll-off frequency 380 is selected in such way to provide an approximately 30 degree phase shift at the selected rotation speed. This conventional solution does not take into account the filter frequency/gain characteristics, instead it sets the desired output signal phase shift.

The conventional phase switching circuit 300 further comprises a first comparator 330 having an input 332, an inverting input 334 and an output 336. The circuit 300 further comprises a second comparator 340 having an input 342, an inverting input 344 and an output 346. The circuit 300 further comprises a third comparator 350 having an input 352, an inverting input 354 and an output 356.

The filtered output 321 of first low pass filter 320 is coupled to input 332 of comparator 330, and to inverting input 354 of comparator 350. The filtered output 323 of first low pass filter 322 is coupled to input 342 of comparator 340, and to inverting input 334 of comparator 330. The filtered output 325 of first low pass filter 324 is coupled to input 352 of comparator 350, and to inverting input 344 of comparator 340.

The conventional phase switching circuit 300 further comprises a phase switching logic circuit 360. The first switched signal SW1 from output 336 of comparator 330 is coupled to the phase switching logic circuit 360. The second switched signal SW2 from output 346 of comparator 340 is coupled to the phase switching logic circuit 360. The third switched signal SW3 from output 356 of comparator 350 is coupled to the phase switching logic circuit 360.

A disadvantage of the conventional solution is that it requires three comparators and 3 tunable low-pass filters, which may require more resources that are available in some programmable devices.

It would be desirable to have a solution that uses a lower number of hardware resources.

BRIEF DESCRIPTION OF THE DRAWINGS

FIG. 6 illustrates a table showing operation of the improved motor system of FIG. 4.

DETAILED DESCRIPTION

An embodiment of a circuit for forming phase shifted signals for three phase BLDC motor control is described.

Figure 1:
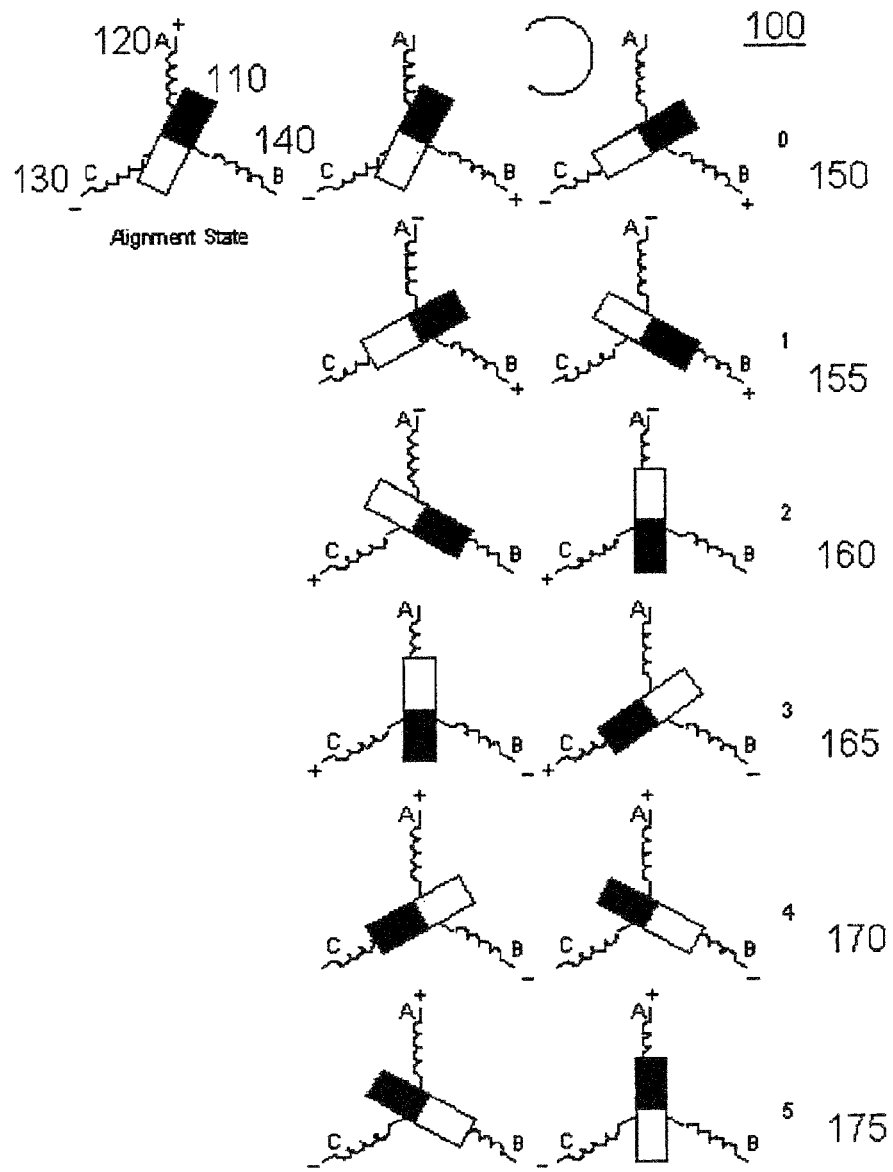
FIG. 1 illustrates a conventional brush-less direct current (BLDC) motor rotor position vs. phase drive voltage.
Figure 2:
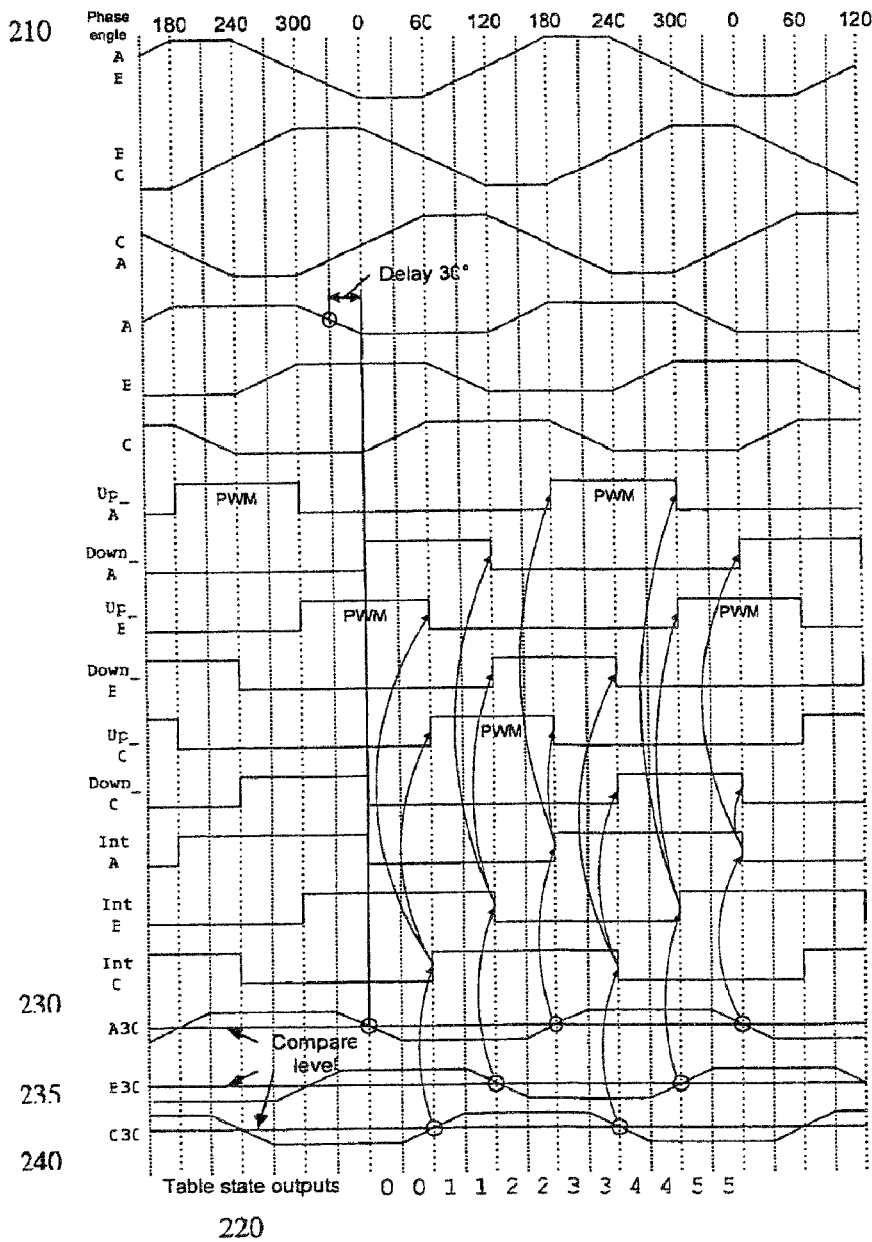
FIG. 2 illustrates waveforms showing operation of the conventional motor system of FIG. 1.
Figure 3:
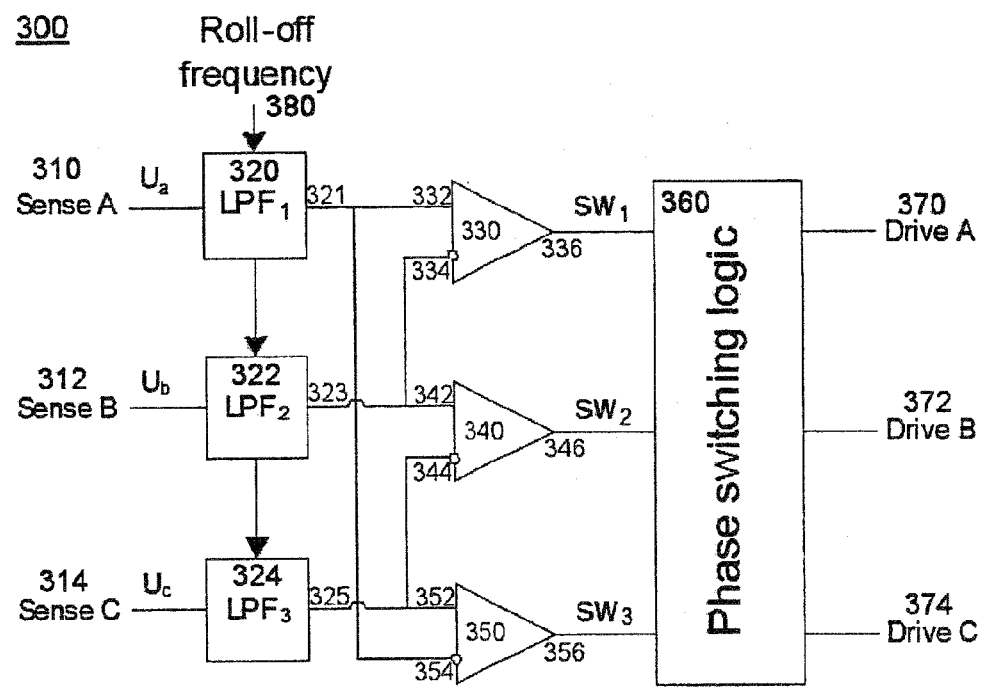
FIG. 3 illustrates conventional phase switching signal generator circuit.
Figure 4:
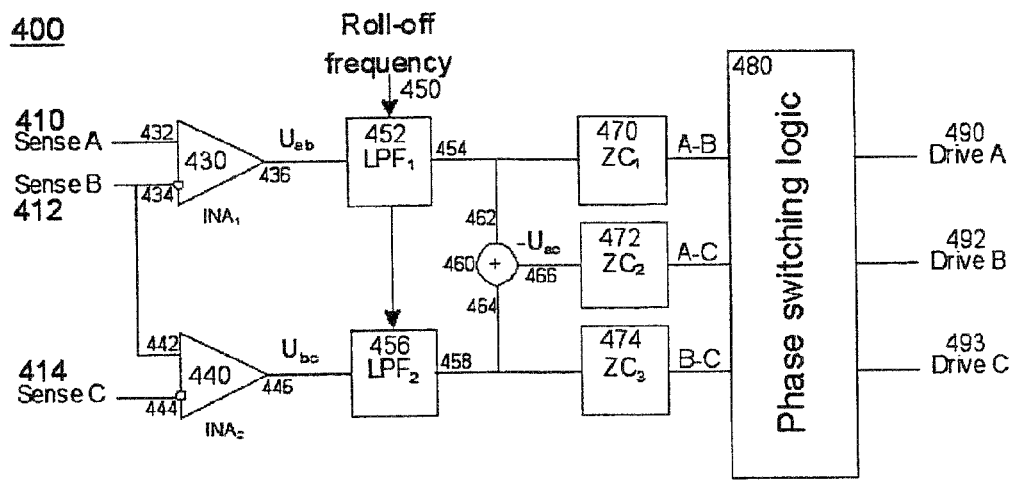
FIG. 4 illustrates an improved motor controller circuit.

FIG. 4 shows an improved motor controller circuit 400, comprising a plurality of sense inputs, an instrumentation amplifier block having inputs coupled to the plurality of sense inputs, a filter block coupled to the instrumentation amplifier block, a sum function coupled to the filter block, and a crossing detector block coupled to the filter block and the sum function. In one embodiment the improved circuit uses two instrumentation amplifiers, two tunable low-pass filters, a summing circuit and three zero-crossing detectors.

The plurality of sense inputs comprises a first sense input 'A' 410, a second sense input 'B' 412 and a third sense input 'C' 414. The instrumentation amplifier block comprises a first instrumentation amplifier 430 and a second instrumentation amplifier block 440. The first instrumentation amplifier 430 comprises a first input 432, a second inverting input 434, and an output 436. The second instrumentation amplifier 440 comprises a first input 442, a second inverting input 444, and an output 446.

The first sense input 410 is coupled the first input 432 of the first instrumentation amplifier 430. The second sense input 420 is coupled the second inverting input 434 of the first instrumentation amplifier 430 and to the first input 442 of the second instrumentation amplifier 440. The third sense input 414 is coupled to the second inverting input 444 of the second instrumentation amplifier 440.

The filter block comprises a first low pass filter 452 having an output 454, a second low pass filter 456 having an output 458, and a roll off frequency 450 coupled to each of the first low pass filter 452 and to the second low pass filter 456. In one embodiment the roll off frequency may be programmable by the user. In another embodiment the roll off frequency may be set at time of manufacture of the device. In another embodiment the roll off frequency may be controlled on the fly by the user. In another embodiment the roll-off frequency is set by control firmware to provide an approximately 60 degree phase shift at desired motor rotation speed. In one embodiment the phase shift should be not less than approximately 30 degree for the actual rotation speed. The approximately 60 degree phase delay is set because the comparison is done between two phase signals, not one phase signal and constant value, proportional to the driver supply voltage.

Although the values of 60 degrees and 30 degrees phase shift provide optimal motor control, in other embodiments the amount of phase shift may be varied while still falling within the scope of this invention. In one example the 30 degree phase shift might be replaced with a range from 20 degrees to 40 degrees, or from 15 degrees to 45 degrees. In another example the 60 degrees phase shift may be replaced with a range from 50 degrees to 70 degrees, or from 45 degrees to 75 degrees for example.

The first low pass filter 452 receives an input from the output 436 of first instrumentation amplifier 430. The second low pass filter 456 receives an input from the output 446 of second instrumentation amplifier 440. The first low pass filter 452 has output 454 which outputs a first filtered signal. The second low pass filter 456 has output 458 which outputs a second filtered signal.

The improved solution further comprises a sum function 460 having a first input 462, a second input 464 and an output 466. The sum function operates to add the inputs received on the first input 462 and the second input 464, and provides the sum to output 466.

In the circuit of FIG. 4, the input 462 of the sum function is coupled to output 454 of the first low pass filter 452. The signal at the input 462 represents the difference between the 'sense A' 410 and 'sense B' 412 input signals e.g. A–B. Similarly, the input 464 of the sum function is coupled to output 458 of the second low pass filter 456. The signal at the input 464 represents the difference between the 'sense B' 412 and 'sense C' 414 input signals e.g. B–C. The output 466 of the sum function provides the sum of (A–B)+(B–C) which provides the result (A–C).

The improved solution further comprises a first zero-crossing-detector 470, a second zero-crossing-detector 472, and a third zero-crossing-detector 474, and a phase switching logic block 480. The zero crossing detector converts an analog input signal into a digital signal by determining when the analog alternating signal crosses some 'zero' point. When this occurs, the output of the zero crossing detector changes polarity.

The first zero crossing detector 470 has an input coupled to output 454 of the first low pass filter 452. The second zero crossing detector 472 has an input coupled to output 466 of the sum function 460. The third zero crossing detector 474 has an input coupled to output 458 of the second low pass filter 456. The outputs of each of the first zero crossing detector 470, second zero crossing detector 472, and third zero crossing detector 474 are coupled to a phase switching logic block 480.

Figure 5:
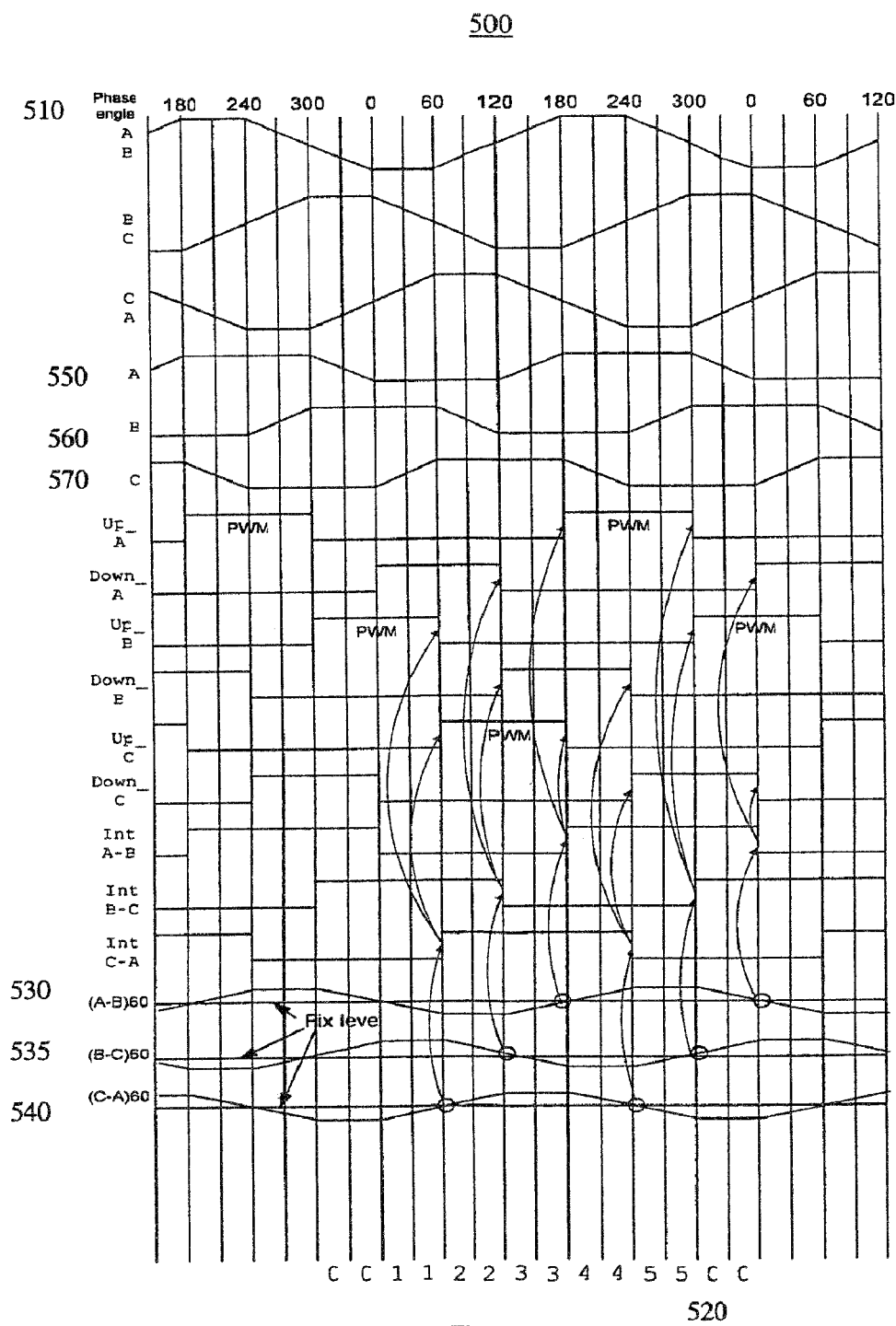
FIG. 5 illustrates waveforms showing operation of the improved motor system of FIG. 4.

The operation of the improved phase switch logic block is shown in the waveforms of FIG. 5. FIG. 5 shows a waveform plot 500 of phase angle 510 of the signals versus the table state of the output 520. The input signals comprise signal 530 '(A–B)60', signal 535 '(B–C)60', and signal 540 '(C–A)60'. The output signals are signal 550 'A', signal 560 'B' and signal 570 'C' which are supplied to the motor coil drivers. These signals 'A', 'B', 'C' are used to drive the bridge up and down side switches (Up_A, Up_B, Up_C, Down_A, Down_B, Down_C) as shown on the waveforms. The phase switching logic block is configurable to provide the motor phase driving signals as function of a back-EMF signal, in one embodiment using a lookup table FIG. 6 illustrates a table 600 showing operation of the improved motor system. Table 600 shows column 610 showing the phase number, where, the phase number (or control phase sequence number) refers to the fact that each rotor revolution cycle is separated into 6 phases. Column 620 shows a first zero-crossing detector output signal ZC1 comparator output for signal 530 '(A−B)60', column 630 shows a second zero-crossing detector output signal ZC2 comparator output for signal 540 '(C−A)60', column 640 shows a third zero-crossing detector output signal ZC3 comparator output for signal 535 '(B−C)60', each for the corresponding phase number.

Column 650 shows the bridge upper size control signal UpA value for the corresponding phase number, column 660 shows the bridge upper size control signal UpB value for the corresponding phase number, and column 670 shows the bridge upper size control signal UpC value for the corresponding phase number.

Column 680 shows the bridge lower size control signal DownA value for the corresponding phase number, column 690 shows the bridge lower size control signal DownB value for the corresponding phase number, and a column 695 shows the bridge lower size control signal DownC value for the corresponding phase number.

Another improved embodiment comprises a method of controlling drive signals, comprising receiving a plurality of phase signals, generating a first phase difference signal and generating a second phase difference signal from the plurality of phase signals, filtering the first phase difference signal and the second phase difference signal, determining a plurality of zero crossing points of phase difference signals, and generating a plurality of motor drive signals. In another embodiment, the step of filtering comprises applying a low-pass filter to the signal, and in a further embodiment selecting a roll off frequency for the low pass filter.

In the improved method the step of determining a plurality of zero crossing points may further comprise providing a first phase difference signal to a first zero crossing detector, providing a second phase difference signal to a second zero crossing detector, and providing a sum of the first phase difference signal and the second phase difference signal to a third zero crossing detector.

Embodiments of the present invention are well suited to performing various other steps or variations of the steps recited herein, and in a sequence other than that depicted and/or described herein. In one embodiment, such a process is carried out by processors and other electrical and electronic components, e.g., executing computer readable and computer executable instructions comprising code contained in a computer usable medium.

For purposes of clarity; many of the details of the improved circuit and method and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A controller circuit, comprising:
   a plurality of sense inputs configured to receive a plurality of motor phase signals;
   a phase difference sense block coupled to the plurality of sense inputs, wherein the phase difference sense block is configured to generate a plurality of phase difference signals using the plurality of motor phase signals;
   a filter block coupled to the phase difference sense block configured to filter the plurality of phase difference signals;
   a summing block, coupled to the filter block, wherein the summing block is configured to add at least two of the plurality of phase difference signals to generate an additional phase difference signal; and
   a crossing detector block coupled to the filter block and the summing block, wherein the crossing detector block is configured to convert the plurality of phase difference signals and the additional phase difference signal into a plurality of digital signals that are used to generate a plurality of motor drive signals.

2. The controller circuit of claim 1, further comprising a phase switching logic block coupled to the crossing detector block configured to receive the plurality of digital signals, wherein the phase switching logic block is configured to generate the plurality of motor drive signals using the plurality of digital signals.

3. The controller circuit of claim 2, wherein the phase switching logic block is configured to provide the plurality of motor drive signals as a function of a back-EMF signal using a lookup table.

4. The controller circuit of claim 1, wherein the phase difference sense block comprises an instrumentation amplifier block.

5. The controller circuit of claim 4, wherein the instrumentation amplifier block comprises:
   a first instrumentation amplifier configured to receive a first phase signal and a second phase signal of the plurality of motor phase signals, wherein the first instrumentation amplifier is configured to generate a first of the plurality of phase difference signals; and
   a second instrumentation amplifier configured to receive the second phase signal and a third phase signal of the plurality of motor phase signals, wherein the second instrumentation amplifier is configured to generate a second of the plurality of phase difference signals.

6. The controller circuit of claim 5, wherein the filter block comprises a first filter and a second filter, wherein the first filter is configured to receive the first phase difference signal and the second filter is configured to receive the second phase difference signal, and wherein the summing circuit is configured to add the first and second phase difference signals to generate a third phase difference signal, wherein the third phase difference signal is the additional phase difference signal.

7. The controller circuit of claim 6, wherein the first and second filters are low pass filters, wherein a roll-off frequency of each of the low pass filters is programmable.

8. The controller circuit of claim 6, wherein the crossing detector block comprises:
- a first zero crossing detector configured to receive the first phase difference signal;
- a second zero crossing detector configured to receive the second phase difference signal; and
- a third zero crossing detector configured to receive the third phase difference signal, wherein each of the first, second, and third zero crossing detectors is configured to convert the respective phase difference signal into the respective digital signal by determining when the respective phase difference signal crosses a zero point, wherein, when the respective phase difference signal crosses the zero point, the respective zero crossing detector changes the polarity of an output of the respective zero crossing detector.

9. The controller circuit of claim 8, further comprising a phase switching logic block coupled to the first, second, and third zero crossing detectors, wherein the phase switching logic block is configured to receive the plurality of digital signals and to generate a first drive signal, a second drive signal, and a third drive signal as the plurality of motor drive signals based on the plurality of digital signals.

10. A controller circuit, comprising:
- a first differential amplifier circuit configured to receive a first phase signal and a second phase signal, wherein the first differential amplifier circuit is configured to generate a first phase difference signal;
- a second differential amplifier circuit configured to receive the second phase signal and a third phase signal, wherein the second differential amplifier circuit is configured to generate a second phase difference signal;
- a filter circuit coupled to the first and second differential amplifier circuits, wherein the filter is configured to filter the first phase difference signal and the second phase difference signal;
- a summing circuit coupled to the filter circuit and configured to add the first and second phase difference signals to generate a third phase difference signal; and
- a crossing detector circuit configured to receive the first and second phase difference signals from the filter circuit, and configured to receive the third phase difference signal from the summing circuit, wherein the crossing detector circuit is configured to convert each of the first, second, and third phase difference signals into a digital signal; and
- a phase switching circuit coupled to the crossing detector circuit and configured to receive the digital signals and generate a plurality of motor drive signals.

11. The controller circuit of claim 10, wherein the first differential amplifier is a first instrumentation amplifier and the second differential amplifier is a second instrumentation amplifier.

12. The controller circuit of claim 10, wherein the filter circuit comprises a first low pass filter and a second low pass filter, wherein the first and second low pass filters each have a roll-off frequency that provides a phase shift greater than approximately thirty degrees at a desired motor rotation speed.

13. The controller circuit of claim 12, wherein the oil off frequency of the filter block is programmable.

14. The controller circuit of claim 12, wherein the roll-off frequency of the filter block is programmed to provide an approximately sixty-degree phase shift at the desired motor rotation speed.

15. A method, comprising:
- receiving a plurality of motor phase signals front a plurality of terminals of a motor;
- generating a plurality of phase difference signals from the plurality of motor phase signals;
- filtering the plurality of phase difference signals;
- adding at least two of the plurality of phase difference signals to generate an additional phase difference signal;
- converting the plurality of phase difference signals and the additional phase difference signal into a plurality of digital signals; and
- generating a plurality of motor drive signals for the motor using the plurality of digital signals.

16. The method of claim 15, wherein said generating the plurality of motor drive signals comprises generating the plurality of motor drive signals as a function of a back-EMF signal using a lookup table.

17. The method of claim 15, wherein said filtering comprises:
- filtering a first of the plurality of phase difference signals using a first low pass filter; and
- filtering a second of the plurality of phase difference signals using a second low pass filter, wherein the first and second low pass filters each have a roll-off frequency that provides a phase shift greater than approximately thirty degrees at a desired motor rotation speed.

18. The method of claim 17, wherein said filtering further comprises programming the roll-off frequency.

19. The method of claim 15, wherein said generating the plurality of motor drive signals comprises:
- generating a first of the plurality of phase difference signals using a first phase signal and a second phase signal of the plurality of motor phase signals; and
- generating a second of the plurality of phase difference signals using the second phase signal and a third phase signal of the plurality of motor phase signals, wherein said adding comprises adding the first and second phase difference signals to generate a third phase difference signal, and wherein the third phase difference signal is the additional phase difference signal.

20. The method of claim 19, wherein said converting comprises converting each of the first, second, and third phase difference signals into the respective digital signal by determining when the respective phase difference signal crosses a zero point, wherein, when the respective phase difference signal crosses the zero point, the respective zero crossing detector changes the polarity of the respective digital signal, and wherein said generating the plurality of motor drive signals comprises generating a first drive signal, a second drive signal; and a third drive signal as the plurality of motor drive signals based on the plurality of digital signals.

* * * * *